United States Patent [19]
Winget

[11] Patent Number: 5,765,864
[45] Date of Patent: Jun. 16, 1998

[54] UNITARY COMPOSITE STEERING WHEEL AND AIR BAG COVER ASSEMBLY AND METHOD OF MAKING SAME

[76] Inventor: Larry J. Winget, 1799 Foxknoll, Leonard, Mich. 48038

[21] Appl. No.: 606,584

[22] Filed: Feb. 26, 1996

[51] Int. Cl.[6] .................................................. B60R 21/22
[52] U.S. Cl. .......................... 280/731; 264/255; 264/328.8; 280/728.3
[58] Field of Search ........................... 280/728.1, 731, 280/728.3; 264/247, 271.1, 275, 255, 328.8; 74/552; 427/400

[56] References Cited

U.S. PATENT DOCUMENTS

| | | |
|---|---|---|
| 3,984,126 | 10/1976 | Goetz et al. . |
| 4,811,472 | 3/1989 | Kobayashi . |
| 4,849,145 | 7/1989 | Hirsch ................................ 264/328.8 |
| 5,228,362 | 7/1993 | Chen et al. . |
| 5,277,442 | 1/1994 | Cuevas . |
| 5,335,935 | 8/1994 | Proos et al. . |
| 5,348,340 | 9/1994 | Humphreys et al. . |
| 5,358,273 | 10/1994 | Onishi et al. . |
| 5,419,585 | 5/1995 | Breed et al. . |
| 5,429,786 | 7/1995 | Jogan et al. . |
| 5,470,099 | 11/1995 | Williams ..................................... 74/552 |
| 5,536,037 | 7/1996 | Cherry ................................... 280/728.2 |
| 5,615,910 | 4/1997 | Margetak et al. ..................... 280/728.3 |

FOREIGN PATENT DOCUMENTS 6-206548  7/1994  Japan ........................................ 74/552

*Primary Examiner*—Eric D. Culbreth
*Attorney, Agent, or Firm*—Brooks & Kushman P.C.

[57] ABSTRACT

A unitary composite steering wheel and air bag cover assembly includes a one-piece plastic body having an air bag cover portion, a one-piece rear rim portion molded from a plastic material compatible with the plastic of the body and a one-piece skeletal frame structure including a rim portion encapsulated therebetween. The plastic may be either a thermoplastic or a thermosetting plastic. In one embodiment, circular front contact surfaces of the rear rim portion bond with circular back contact surfaces of a front rim portion of the body by diffusion between the contact surfaces thereof with the frame structure therebetween. The resulting assembly is hardened so that a molecular concentration gradient is formed at an interface between the plastics to bond the plastics by diffusion. In another embodiment, the rear rim portion and the body are molded from the same plastic material in a single mold cavity with the rim portion of the frame structure encapsulated therebetween and an air bag aperture of the frame structure covered by and aligned with the air bag cover portion at its predetermined tear seam design.

5 Claims, 4 Drawing Sheets

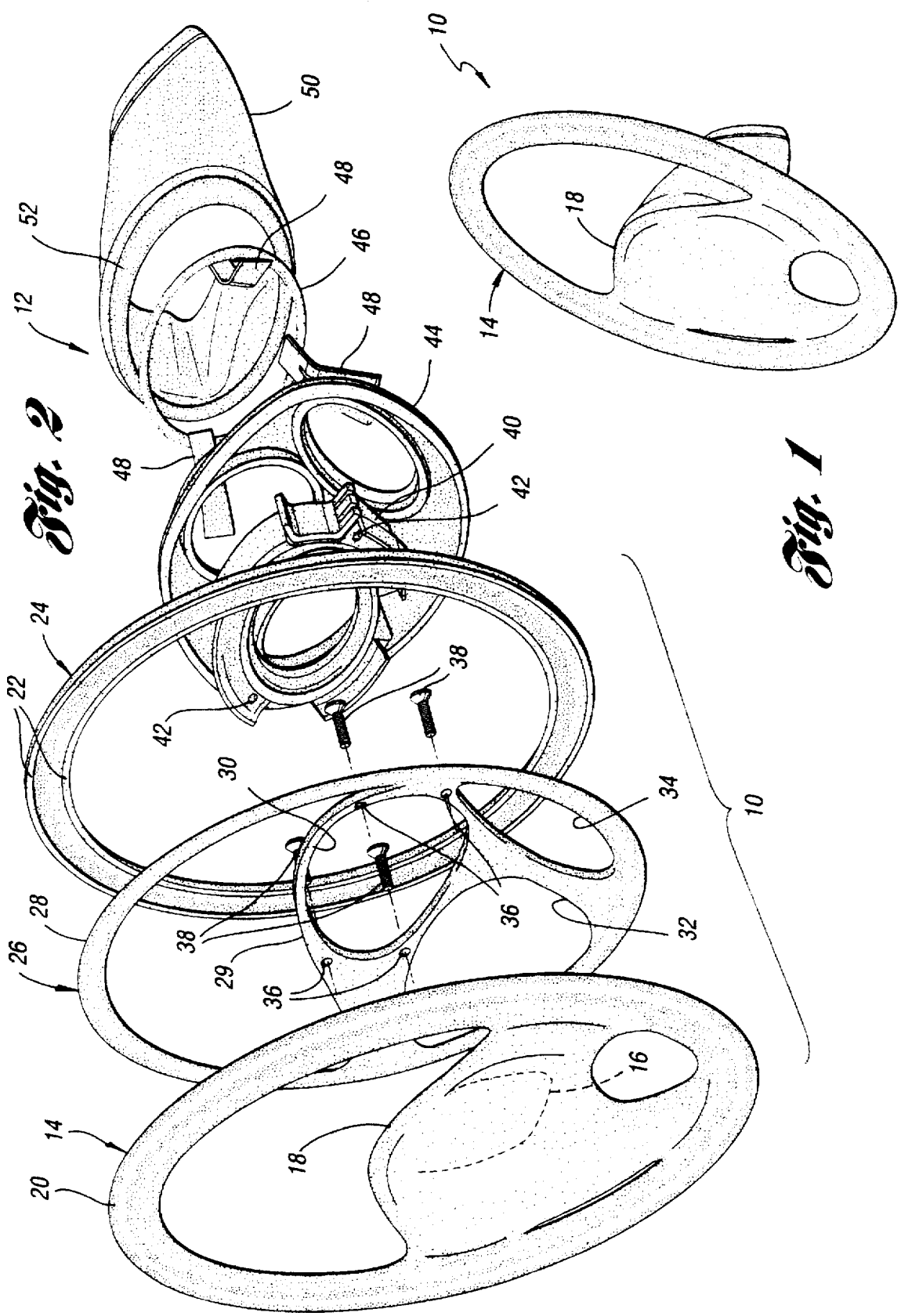

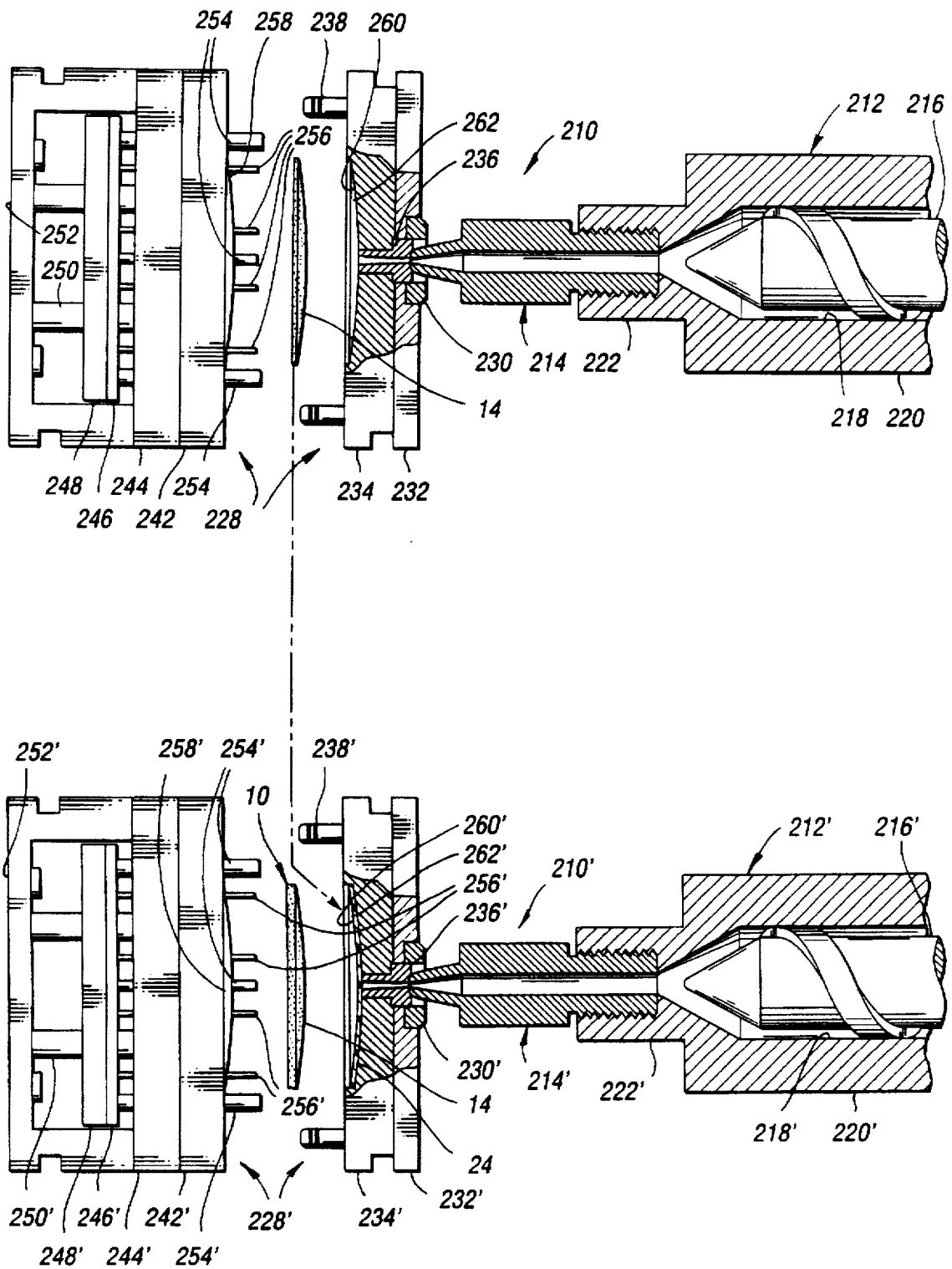

5,765,864

UNITARY COMPOSITE STEERING WHEEL AND AIR BAG COVER ASSEMBLY AND METHOD OF MAKING SAME

TECHNICAL FIELD

This invention relates to steering wheels and air bag cover assemblies and methods of making same, and, in particular, to plastic steering wheels and air bag cover assemblies and methods of making same.

BACKGROUND ART

Supplemental occupant restraint systems for motor vehicles (i.e., air bags) typically require covers which allow an air bag to exit the air bag cover when deployed. One type of air bag cover includes a front panel which has a predetermined tear seam design formed therein to allow the air bag to exit the air bag cover when deployed.

Not only must the air bag cover perform the utilitarian function of breaking apart along its predetermined tear seam design, but it should also match the vehicle interior decor and trim materials such as the instrument panel, seats, door panels, steering wheel and posts.

Also, not only must the air bag cover allow the air bag to exit the air bag cover when deployed, but also the air bag cover must stay together to the extent that it does not break apart so as to present projectile(s) which may injure an occupant of the motor vehicle. U.S. patent to Goetz et al., U.S. Pat. No. 3,984,126 discloses a unitary steering wheel and air bag cover assembly made from plastic.

The U.S. patent to Onishi et al., U.S. Pat. No. 5,358,273 also discloses a unitary steering wheel and air bag cover assembly.

The U.S. patent to Cuevas, U.S. Pat. No. 5,277,442 discloses an air bag system including a vehicle steering wheel having a structural frame which includes a integral retainer. The system also includes a cover which, together with the retainer forms a container.

The U.S. patent to Chen et al., U.S. Pat. No. 5,228,362 discloses a vehicle steering wheel having an armature which defines a structural circular steering wheel.

The U.S. patents to Humphreys et al., U.S. Pat. No. 5,348,340, Breed et al., U.S. Pat. No. 5,419,585, and Proos et al., U.S. Pat. No. 5,335,935 all disclose conventional steering wheel assemblies having an air bag subassembly.

SUMMARY OF THE INVENTION

It is an object of the present invention to provide a unitary composite steering wheel and air bag cover assembly including a one-piece plastic body injection molded at a first injection station and a one-piece rear rim portion injection molded at a second injection station from a plastic material compatible with the plastic of the body so that a circular front contact surface of the rear rim portion bonds with a circular back contact surface of a front rim portion of the body by diffusion between the contact surfaces thereof.

Another object of the present invention is to provide a unitary composite steering wheel and air bag cover assembly wherein an air bag cover portion perfectly matches a rim of the assembly in color and other physical characteristics.

Yet still another object of the present invention is to provide a method for making a unitary composite steering wheel and air bag cover assembly for an inflatable air bag system.

In carrying out the above objects and other objects of the present invention, a unitary composite steering wheel and air bag cover assembly is provided. The assembly cover includes a one-piece, plastic body injection molded at a first injection station and including a front rim portion and an air bag cover portion with a predetermined tear seam design formed therein. The front rim portion includes a circular back contact surface. The air bag cover portion is adapted to overlie an inflatable air bag system. The assembly also includes a one-piece rear rim portion injection molded at a second injection station from a plastic material compatible with the plastic of the body so that a circular front contact surface of the rear rim portion bonds with the back contact surface of the front rim portion by diffusion between the contact surfaces thereof at one of the first and second injection station to prevent the body from separating from the rear rim portion during use of the assembly. Finally, the assembly includes a one-piece skeletal frame structure including a circular rim portion totally enclosed within the bonded front and rear rim portions. The frame structure has an aperture aligned with the air bag cover portion to allow an air bag of the air bag system to exit the air bag cover portion when deployed.

Also in carrying out the above objects and other objects of the present invention, a method is provided for making a unitary composite steering wheel and air bag cover assembly for an inflatable air bag system. The method includes the steps of injecting a first molten plastic at a first injection station having a shape defining a first part including a rim portion, hardening the resulting first part and moving the hardened first part and a skeletal frame structure into a second injection station having a shape defining the entire assembly. The method also includes the steps of injecting a second molten plastic at the second injection station at a temperature and pressure sufficient to melt a surface layer of the rim portion of the first part, and hardening the resulting assembly so that a molecular concentration gradient is formed at an interface between the first and second plastics to bond the first and second plastics by diffusion with the skeletal structure therebetween. Finally, the method includes the step of removing the completed assembly from the second injection station.

Still further in carrying out the above objects and other objects of the present invention, a unitary composite steering wheel and air bag cover assembly is provided. The assembly includes a one-piece, plastic body injection molded in a mold. The body includes a front rim portion and an air bag cover portion with a predetermined tear seam design formed therein. The air bag cover portion is adapted to overlie an inflatable air bag system. The assembly also includes a one-piece rear rim portion injection molded in the mold from the same plastic material of the body so that the rear rim portion bonds with the front rim portion in the mold to prevent the body from separating from the rear rim portion during use of the assembly. Finally, the assembly includes a one-piece skeletal frame structure including a circular rim portion totally enclosed within the bonded front and rear rim portions. The structure has an aperture aligned with the air bag cover portion to allow an air bag of the air bag system to exit the air bag cover portion when deployed.

Yet further in carrying out the above objects and other objects of the present invention, a method is provided for making a unitary composite steering wheel and air bag cover assembly for an inflatable air bag system. The method includes the steps of inserting a skeletal frame structure having an air bag aperture surrounded by a rim portion into a mold cavity of a mold having a shape defining the entire assembly, and injecting a molten plastic into the mold cavity of the mold to cover the entire top surface of the structure, the air bag aperture and the entire rim portion of the structure. The method also includes the step of hardening the resulting assembly. Finally, the method includes the step of removing the completed assembly from the mold.

In each of the above methods and assemblies, the plastic may be either a thermoplastic or a thermo-setting plastic.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view showing a unitary composite assembly steering wheel and air bag cover assembly constructed in accordance with the present invention;

FIG. 2 is an exploded view of the assembly together with other parts including mounting parts of an air bag system adapted to be mounted at an end of a steering wheel post;

FIG. 3 is a schematic view of a pair of conventional injection molding systems which may be utilized to make the assembly of the present invention;

BEST MODE FOR CARRYING OUT THE INVENTION

Figure 4:
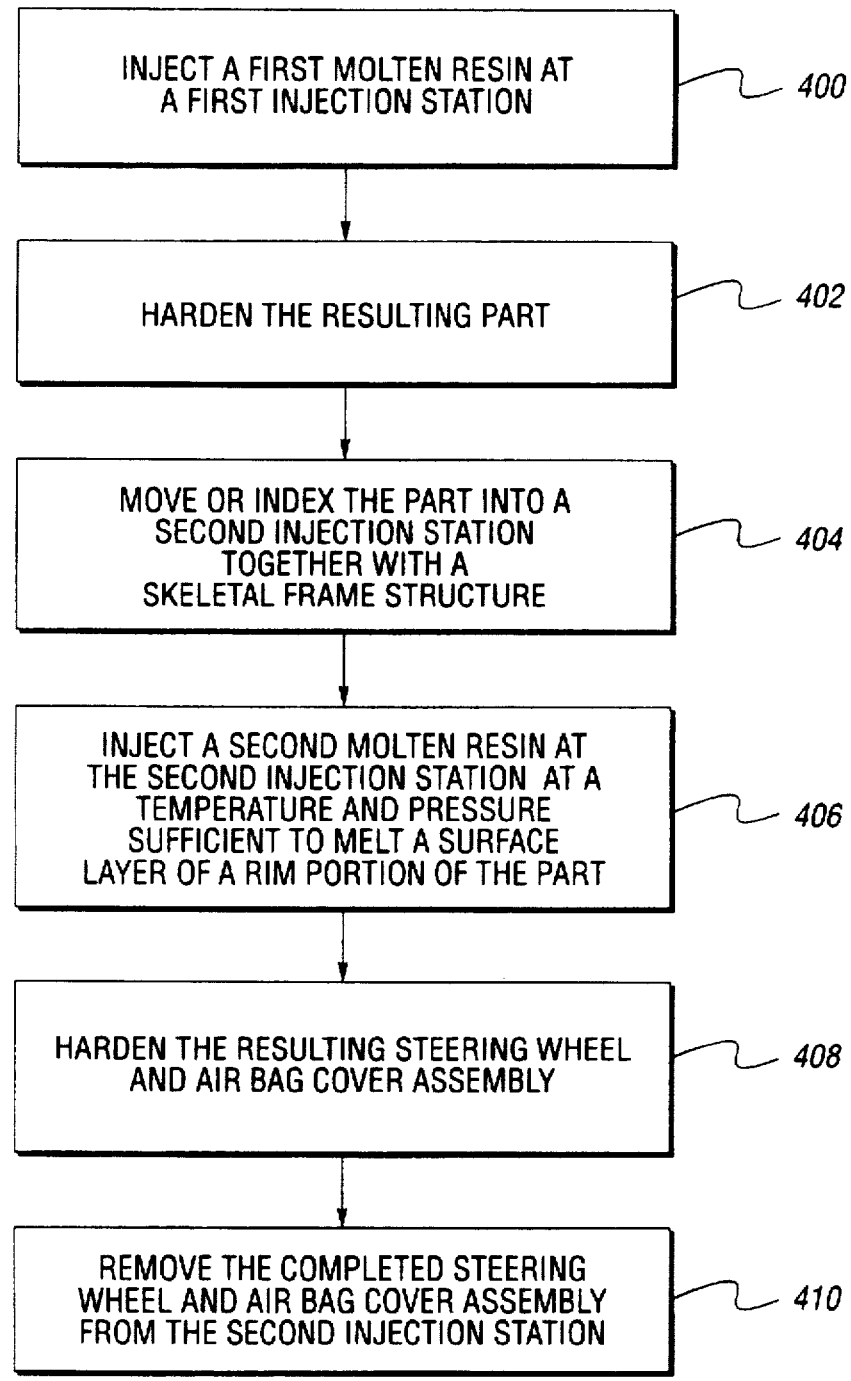
FIG. 4 is a block diagram flow chart illustrating the various method steps taken to practice a first embodiment of the method of the present invention in order to make the assembly.

Referring now to the drawing figures, there is illustrated in FIG. 1 a perspective view showing an embodiment of a unitary composite steering wheel and air bag cover assembly, generally indicated at 10, constructed in accordance with the present invention. The assembly 10 preferably is installed over an inflatable air bag system, a support structure of which is generally shown at 12 in FIG. 2, mounted at the end of a steering wheel post (not shown). The occupant restraint air bag system is typically mounted at the interior end of the steering wheel post adjacent the assembly 10 so that the air bag may deploy between the vehicle driver and the steering wheel post to prevent injury during an accident or other period of sudden deceleration.

Referring specifically now to FIG. 2, there is illustrated in detail an embodiment of the assembly 10 constructed in accordance with the present invention. The assembly 10 includes a one-piece injection molded plastic body, generally indicated at 14, which is preferably injection molded in a first mold at a first injection station (FIG. 3) and has a predetermined tear seam design as indicated at 16 formed in an air bag cover portion 18. The air bag cover portion 18 is adapted to overlie an inflatable air bag system. The plastic body 14 also includes a front rim portion 20 having circular back contact surfaces (not shown) but which are substantially identical to circular front contact surfaces 22 of a one-piece rear rim portion, generally indicated at 24, of the assembly 10.

The assembly 10 also includes a one-piece skeletal frame structure, generally indicated at 26. The frame structure 26 is preferably made into a wire frame, a casting or a stamping from metal, such as steel, and includes a circular rim portion 28. The frame structure 26 also includes a central support portion 29 having a plurality of apertures 30, 32 and 34 formed therethrough. The aperture 30 is aligned with the cover portion 18. An air bag of the air bag system exits through the aperture 30 and through the cover portion 18 when deployed.

The support portion 29 preferably has a plurality of threaded holes 36 formed about the aperture 30 to receive and retain a like plurality of threaded fasteners 38. The fasteners 38 secure a steel inflator assembly collar 40 of the support structure 12 to the frame structure 26 at holes 42.

As noted above, the assembly 10 also includes the one-piece rear rim portion 24 injection molded in a second mold at a second injection station (also FIG. 3) from a plastic material compatible with the plastic of the body 14 so that the circular back contact surfaces of the front rim portion 20 bond with the front contact surfaces 22 of the rear rim portion 24 by diffusion between the surfaces thereof in the second mold to prevent the body 14 from separating from the rear rim portion 24 during use of the assembly 10.

Preferably, the plastic of the body 14 is a thermoplastic such as TPO, TPU, DYM, (a trademark of the DuPont Company for certain types of thermoplastics); santoprene, etc., whereas the plastic material of the rear rim portion 24 is a compatible plastic. Alternatively, the plastics may be a thermosetting or RIM (reaction injection molding); plastic or other type of plastic such as RIM urethane.

Typically, if the plastic is a thermoplastic, the durometer of the body 14 will be in the range of about 37 Shore D to 52 Shore D, while the flexural modulus will be in the range of about 30,000 to 70,000 psi. If a RIM plastic is used, the modulus could be lower.

The support structure 12 also includes a plastic trim plate 44, a metal mounting rim 46 with attachment flanges 48 and a steering column cowl 50 having a close-out seal 52.

Referring now to FIG. 3, there is illustrated a first conventional injection molding system or injection station, generally indicated at 210, and a second conventional injection molding system or injection station, generally indicated at 210', for collectively making the unitary composite steering wheel and air bag cover assembly 10 of the present invention.

However, it is to be understood that other methods and systems may be utilized to make a unitary composite steering wheel and air bag cover assembly of the prevent invention. For example, a rotating or indexing platen or table may be used at a single injection or RIM molding system or injection station.

A further alternative is to place the skeletal frame structure 26 within a single mold cavity which may have pins on which the frame structure 26 can be elevated. Then, a molten resin is injected into the cavity all around the structure 26 so that the assembly 10 is formed. Then the holes in the assembly 10 caused by the pins may be filled or, if small enough, left alone. Alternatively, the back surface of the structure 26 rests on a surface of a mold half so that the back surface of the structure 26 does not contact the plastic except for the entire rim portion 28 thereof.

Only the first injection station 210 will be specifically described and not the second injection station 210' or any other system or station. However, it is to be understood that parts of the second injection station 210' which have the same or similar function to the parts of the first injection station 210 have the same reference numeral except with a prime designation.

Briefly, the injection molding station 210 includes an injection molding machine, generally indicated at 212, having a nozzle, generally indicated at 214, for injecting predetermined amounts or shots of molten resin. The injection molding machine 212 includes a hydraulic screw ram 216 which is disposed in a bore 218 formed in a barrel 220 of the injection molding machine 212. The ram 216 plasticizes and advances resin towards the nozzle 214. Upon complete plasticization of the resin, the screw ram 216 is hydraulically advanced towards threaded portions 222 of the barrel 220 to inject molten plastic through the nozzle 214, as is well known in the art.

The station 210 also includes a mold or mold body generally indicated at 228. As illustrated in FIG. 3, the mold 228 comprises a two-plate mold body. One of the plates includes a locating ring 230 for locating the injection end of the nozzle 214. The locating ring 230 is mounted on a clamp plate 232 which, in turn, is fixably connected to a cavity retainer plate or cavity plate 234. A sprue bushing 236 is disposed within the locating ring 230 and is supported by the clamp plate 232. Leader pins 238 on the cavity plate 234 provide the male half of the male-female connection of the first plate with the second plate of the two-plate mold 228. In particular, the second plate includes leader pin bushings (not shown) which slidably receive and retain the leader pins therein in the closed position of the mold 228. The leader pin bushings are retained within a core retainer plate 242. The core retainer plate 242 is fixably connected to a support plate 244 which, in turn, is connected to an injector retainer plate 246. The injector retainer plate 246 is connected to an injector plate 248 which, in turn, is supported by support pillars 250. Support plate 244 is also fixably connected to the ends of a U-shaped ejector housing 252 to which the support pillars 250 are also connected. The plate 246 supports a plurality of return pins 254 and ejector pins 256 which extend toward the plate 234 and through the plates 242 and 244. The ejector pins 256 are provided for ejecting particular injection molded part(s) from the mold 228.

Opposing surfaces of male and female mold parts 258 and 260 respectively define a mold cavity 262. The mold part 258 is supported on the plate 242 and the mold part 260 is supported on the cavity retainer plate 234.

As illustrated in FIG. 3, there is schematically illustrated how the one-piece thermoplastic body 14 is first molded at the first injection station 210 then placed in the mold cavity 262' with the one-piece skeletal frame structure (not shown in FIG. 3). Thereafter, a one-piece rear rim portion 24 is molded in the second plastic injection station 210' thereover the frame structure at its rim portion to form the completed unitary composite steering wheel and air bag cover assembly, generally indicated at 10, wherein the one-piece rear rim portion 24 overlies the body 14.

Referring now to FIG. 4, there is illustrated the various process steps of the method of the present invention with further reference to FIG. 3.

At block 400, initially the first molten plastic is injected into the first mold cavity of the first injection station through its injection nozzle 214.

At block 402, the resulting part 14, if formed from a thermoplastic, is cooled to a temperature beneath the softening point of the plastic. If the plastic is a thermosetting plastic, the plastic is heated until the plastic is hardened.

At block 404, the part 14 is moved into a second injection station together with the skeletal frame structure 26. In an indexing system, the part is indexed from the first injection station into the second injection station.

At block 406, the second molten plastic is injected at the second injection station through its injection nozzle 214' at a temperature and pressure sufficient to melt a surface layer of a rim portion of the part 14.

At block 408, the resulting steering wheel and air bag cover assembly 10 is cooled to a temperature beneath the softening point of both plastics when the plastics are thermoplastics. When the plastics are thermosetting plastics, the plastics are heated.

Finally, at block 410, the completed steering wheel and air bag cover assembly 10 is removed from the second injection station.

Figure 5:
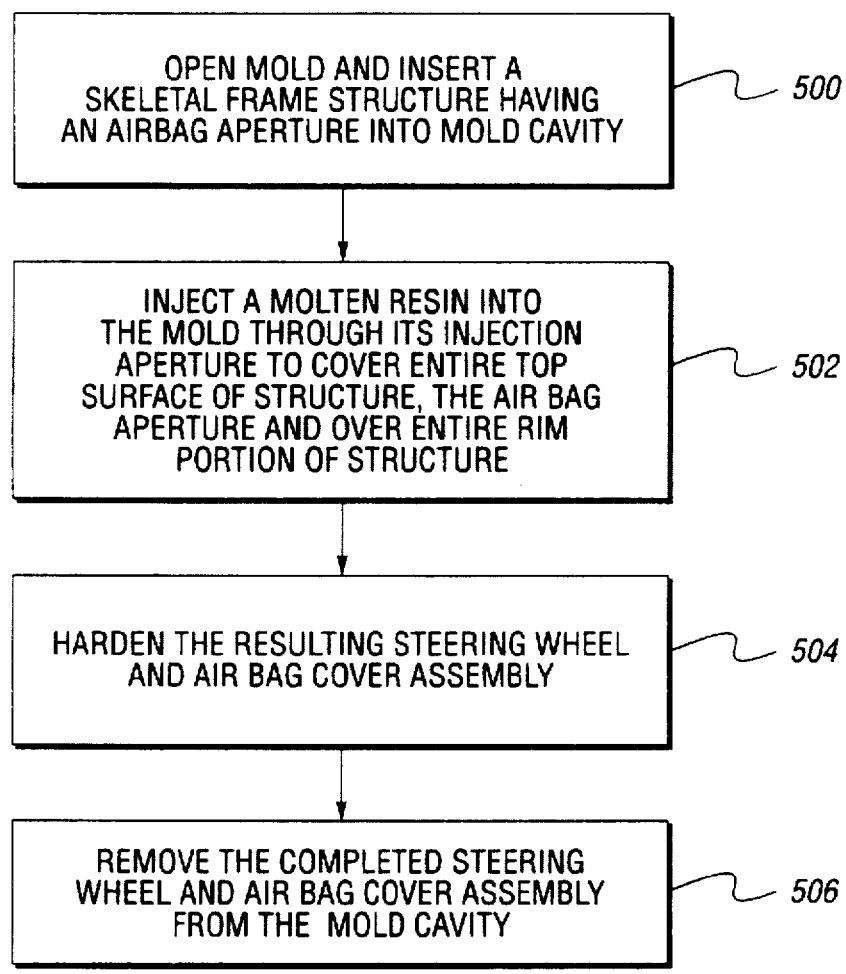
FIG. 5 is a block diagram flow chart of a second embodiment of the method.

Referring now to FIG. 5, there is disclosed in block diagram flow chart form an embodiment of a method for forming another unitary composite steering wheel and air bag cover assembly of the present invention. The unitary composite steering wheel air bag cover assembly of the second embodiment is identical to the assembly 10 of the first embodiment except the front rim portion does not include a circular back contact surface and the rear rim portion does not include a circular front contact surface since the front and rear portions bond together in the same mold cavity and are made from the same plastic material.

With specific reference to FIG. 5, at block 500, a mold is opened and the skeletal frame structure 26 having the air bag aperture 30 and the rim portion 28 is inserted into a mold cavity. The mold cavity has a shape defining the entire assembly. The structure 26 may be supported on pins within the cavity or may rest on a mold half as long as the exterior outer surface of the rim portion 28 can be encapsulated with molten resin within the mold cavity.

At block 502, the molten resin is injected into the mold through its injection aperture to cover the entire top surface of the structure 26, the air bag aperture 30, and the entire rim portion 28 of the structure 26.

At block 504, the resulting steering wheel and air bag cover assembly 10 is cooled to a temperature beneath the softening point of the resin when the plastic resin is a thermoplastic. When the plastic is a thermosetting plastic, the plastic is hardened by heating.

Finally, at block 506, the mold is open and the completed steering wheel and air bag cover assembly 10 is removed from the mold.

In this way, the assembly 10 is formed from the structure 26 and a molten plastic which forms a one-piece body 14 including an integral front rim portion 20, an integral air bag cover portion 18 with a predetermined tear seam design 16 formed therein, and an integrally formed one-piece rear rim portion 24 in a single mold cavity. The air bag cover portion 18 with the predetermined tear seam design 16 and the aligned aperture 30 allow an air bag to exit the cover portion 18 when deployed.

While the best mode for carrying out the invention has been described in detail, those familiar with the art to which this invention relates will recognize various alternative designs and embodiments for practicing the invention as defined by the following claims.

What is claimed is:

1. A unitary composite steering wheel and air bag cover assembly comprising:

a one-piece, plastic body including a front rim portion and an air bag cover portion with a predetermined tear seam design formed therein, the front rim portion including circular inner and outer back contact surfaces and the air bag cover portion being adapted to overlie an inflatable air bag system;

a one-piece rear rim portion including circular inner and outer front contact surfaces made from a plastic material compatible with the plastic of the body so that the circular inner and outer front contact surfaces of the rear rim portion bond with the circular inner and outer back contact surfaces of the front rim portion, respectively by diffusion between the contact surfaces thereof to prevent the body from separating from the rear rim portion during use of the assembly; and a one-piece skeletal frame structure including a circular rim portion totally enclosed within the bonded front and rear rim portions between the bonded inner and outer front and back contact surfaces and having an aperture aligned with the air bag cover portion to allow an air bag of the air bag system to exit the air bag cover portion when deployed.

2. The assembly as claimed in claim 1 wherein the frame structure includes a central support portion having the aperture and adapted to be connected to the air bag system about the aperture.

3. The assembly of claim 1 wherein the plastic of the body is a thermoplastic.

4. The assembly of claim 3 wherein the thermoplastic body has a durometer reading in the range of about 37 Shore D to 52 Shore D and a flexural modulus in the range of about 30,000 to 70,000 psi.

5. The assembly of claim 1 wherein the plastic of the body is a thermosetting plastic.

* * * * *